United States Patent [19]

Hearn et al.

[11] Patent Number: 5,894,076
[45] Date of Patent: Apr. 13, 1999

[54] PROCESS FOR ALKYLATION OF BENZENE

[75] Inventors: Dennis Hearn; Robert P. Arganbright; Lawrence A. Smith, Jr.; John R. Adams, all of Houston, Tex.

[73] Assignee: Catalytic Distillation Technologies, Pasadena, Tex.

[21] Appl. No.: 08/854,731

[22] Filed: May 12, 1997

[51] Int. Cl.$^6$ .................. C07C 5/02; C07C 7/163; C07C 2/66; C10G 45/00

[52] U.S. Cl. .................. 585/251; 585/258; 585/259; 585/323; 585/448; 208/57; 208/85; 208/209; 208/212; 203/DIG. 6

[58] Field of Search .................. 585/251, 258, 585/259, 260, 264, 265, 323, 448; 108/57, 85, 200–212; 203/28, 29, 71, DIG. 6; 208/57, 85, 204, 216

[56] References Cited

U.S. PATENT DOCUMENTS

| | | | |
|---|---|---|---|
| 2,371,163 | 3/1945 | Francis et al. | 260/671 |
| 3,167,498 | 1/1965 | Kronig et al. | 208/143 |
| 3,310,592 | 3/1967 | Fukuda et al. | 260/672 |
| 3,969,222 | 7/1976 | Hayes | 208/210 |
| 4,209,383 | 6/1980 | Herout et al. | 208/93 |
| 4,232,177 | 11/1980 | Smith, Jr. | 585/324 |
| 4,316,997 | 2/1982 | Vaughan | 385/458 |
| 4,371,714 | 2/1983 | Young | 568/628 |
| 4,423,254 | 12/1983 | Olah | 568/781 |
| 4,469,908 | 9/1984 | Burress | 585/467 |
| 4,849,569 | 7/1989 | Smith, Jr. | 585/446 |
| 4,975,179 | 12/1990 | Harandi et al. | 208/66 |
| 5,082,990 | 1/1992 | Hsieh et al. | 585/467 |
| 5,210,348 | 5/1993 | Hsieh et al. | 585/253 |
| 5,446,223 | 8/1995 | Smith, Jr. | 585/313 |
| 5,476,978 | 12/1995 | Smith, Jr. et al. | 585/323 |
| 5,595,634 | 1/1997 | Hearn et al. | 203/29 |
| 5,597,476 | 1/1997 | Hearn et al. | 208/208 R |

FOREIGN PATENT DOCUMENTS

| | | | |
|---|---|---|---|
| 338517 | 5/1972 | U.S.S.R. | 585/448 |
| 1080586 | 8/1967 | United Kingdom . | |

Primary Examiner—Glenn A. Caldarola
Assistant Examiner—Thuan D. Dang
Attorney, Agent, or Firm—Kenneth H. Johnson

[57] ABSTRACT

A process for the alkylation of benzene contained in a mixed refinery stream is disclosed wherein the refinery stream is first subjected to hydrogenation of higher olefins prior to alkylation of the benzene with selected types and quantities of lower olefins. Streams containing sulfur compounds may be pretreated by hydrodesulfurization. All of the process steps are advantageously carried out in distillation column reactors to take advantage of that mode of operation.

16 Claims, 2 Drawing Sheets

PROCESS FOR ALKYLATION OF BENZENE

BACKGROUND OF THE INVENTION

1. Field of the Invention

The present invention relates to the a process for the alkylation of benzene contained in a mixed refinery stream. More particularly the invention relates to a process wherein feeds containing olefins is hydrogenated to remove the olefins and then to alkylation of the benzene with controlled types and quantities of olefins. The process is also defined by pretreating sulfur containing refinery streams by hydrodesulfurization of any organic sulfur contained within the stream. All of the process steps may be carried out in distillation column reactors to take advantage of that mode of operation.

2. Related Information

Ethyl benzene and cumene are currently produced by the reaction of benzene and the respective olefin, ice., ethylene or propylene by acid catalysis. In some known processes the catalyst is highly corrosive and has a relatively short life, e.g. $AlCl_3$, $H_3PO_4$ on clay, $BF_3$ on alumina, and others require periodic regeneration, e.g. molecular sieves. In addition the exothermicity of the reaction and the tendency to produce polysubstituted benzene require low benzene conversions per pass with large volume recycle in conventional processes.

To overcome many of the disadvantages of the conventional processes a process has been developed wherein the reaction of the olefin with benzene is carried out concurrently with separation of the products by fractional distillation. One embodiment of that process is disclosed in U.S. Pat. No. 5,243,115 which utilizes a reaction system wherein the components of the reaction system are concurrently separable by distillation, using the catalyst structures as the distillation structures. Such systems are described variously in U.S. Pat. Nos. 4,215,011; 4,232,177; 4,242,530; 4,250,052; 4,302,356; and 4,307,254.

In addition, a variety of catalyst structures for this use are described in U.S. Pat. Nos. 4,443,559 and 5,348,710 which are incorporated herein.

The reduction in the lead content of gasolines and the use of lead anti-knock compounds has led to a search for other ways to improve the octane number of blending components for gasoline. The alternatives to uses of lead anti-knock compounds are chemical processing and the use of other additives.

One common process long used by the refinery industry to upgrade raw naphtha to high octane gasoline is catalytic reforming. Because of the multiplicity of the compounds in the raw naphtha, the actual reactions which occur in catalytic reforming are numerous. However, some of the many resulting products are aryl or aromatic compounds, all of which exhibit high octane numbers. The aryl compounds produced depend upon the starting materials which in a refinery are controlled by the boiling range of the naphtha used and the crude oil source. The "reformed" product from a catalytic reforming process is commonly called reformate and is often separated into two fractions by conventional distillations—a light reformate having a boiling range of circa 115–250° F. and a heavy reformate having a boiling range of circa 250–350° F. The aryl compounds in each fraction are thus dependent upon their boiling points. The light reformate contains lower boiling or lighter aryl compounds, e.g., benzene and toluene.

The light reformate is that portion containing benzene and lighter components. Now the complex model for gasoline requires severe reduction of the benzene content of gasoline, while maintaining the octane of the gasoline. One effective means to achieve this is to alkylate the benzene, however the olefin streams for this purpose may be expensive or otherwise employed. Thus in one embodiment of the present invention olefins normally destined for fuel gas are used for the alkylation.

Benzene is also contained in appreciable quantities in such other refinery streams as straight run naphtha and to a lesser extent naphtha from catalytic crackers. The conventional method of producing benzene for the alkylation reaction has been the solvent extraction of benzene from such mixed refinery streams followed by distillation to separate the benzene from higher boiling aromatic compounds such as toluene and xylenes which are also present in the extracted streams. Additionally a considerable amount of energy must be expended to separate the solvent from the extracted aromatics.

The alkylation of benzene contained in a naphtha from a catalytic reforming unit has been suggested in U.S. Pat. No. 5,082,990 which also suggests utilizing the previously described concurrent reaction/distillation. However, the alkylation of the benzene is simply to reduce the benzene concentration to meet expected EPA requirements and improve octane. The olefins used for the alkylation are contained in another mixed refinery stream which generally consists of an off gas from a catalytic cracking unit. The melange of olefins along with the mix of aromatics leads to a complex mixture of products which may include alkylated toluene and dialkylated products. This is not a problem in the disclosed process since the purpose is to produce gasoline.

More recently it has been found that a primary cause of catalyst deactivation in aromatic alkylation processes is the presence of high concentrations of olefin. The present inventors have determined that an exponential relationship exists between olefin concentration and catalyst life. Thus clearly the alkylation requires a careful control of the olefin reactant. Further, the deactivation is more rapid with higher olefins above $C_4$.

The light reformate itself also contains olefinic compounds which are higher boiling. Also the benzene from steam or catalytic cracking also contains appreciable olefins. The higher boiling olefins are longer chain unsaturates which can also react either with the aromatics or with themselves. Regardless of source, the reaction of these higher olefinic compounds is undesirable because they coke up and foul the catalyst causing accelerated catalyst aging.

A problem associated with the use of straight run naphtha or naphtha from a steam or catalytic cracking process is that the naphtha may contain sulfur contaminants, such as thiophene, which in the benzene boiling range in cracked naphthas or mercaptans in straight run naphtha. Thiophene is an unwanted contaminant in either ethyl benzene or cumene. Sulfur contaminants, such as may be found in a straight run naphtha directly from a crude distillation column, may also be mercaptans which are poisons to olefin hydrogenation catalysts.

It is an advantage of the present invention that benzene in a straight run naphtha or reformate stream is alkylated to ethyl benzene or cumene without the extra solvent extraction step.

It is another advantage of the present invention that the olefins in the reformate or straight naphtha stream are hydrogenated to increase catalyst life.

It is another advantage of the present invention that organic sulfur is removed from the naphtha fraction prior to hydrogenation to prevent poisoning of the catalyst.

SUMMARY OF THE INVENTION

Briefly, the present invention is a process for the alkylation of aromatic compounds, in particular benzene, contained in a reformate stream, a straight naphtha stream or other naphtha fraction, comprising treating the naphtha to remove unsaturated materials, comprising olefins, diolefins and acetylenes, and then alkylating the benzene to produce ethyl benzene or cumene. In order to protect the hydrogenation catalyst and to otherwise improve the materials for use as gasoline components, feeds containing sulfur compounds are preferably treated to remove them, for example by hydrodesulfurization.

Each stage of the process, e.g. hydrogenation of the unsaturates and alkylation, is preferably carried out in a distillation column reactor to take advantage of the concurrent reaction and distillation within each reactor.

The olefin feed to the alkylation reaction is preferably added below the alkylation catalyst bed thereby allowing mixing of the reactants before contact with the catalyst bed.

Also, in order to achieve high selectivity toward mono alkylation (which is a preferred aspect of the present invention) there is a large excess of the organic aromatic compound to the olefin in the reactor in the range of 2 to 100 moles of aryl preferably at least 50 per mole of olefin.

DESCRIPTION OF THE PREFERRED EMBODIMENT

Figure 1:
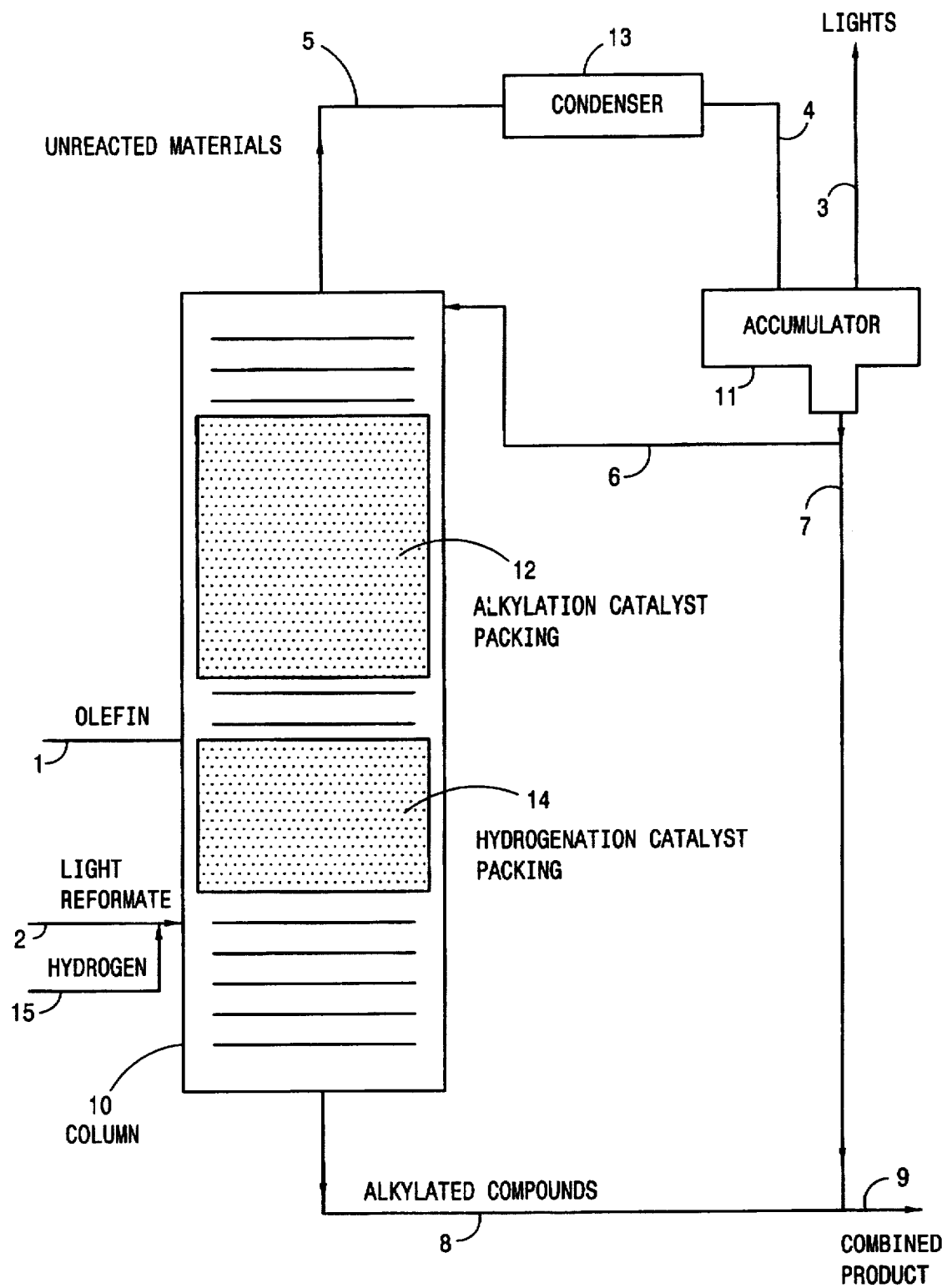
FIG. 1 is a flow diagram in schematic form of one embodiment of the invention.

In one embodiment used to treat naphtha feed containing sulfur compounds, hydrodesulfurization takes place in a first distillation column reactor which takes $H_2S$ and light ends overheads. The desulfurized bottoms are taken to a second tower which acts as a dehexanizer taking $C_6$ and lighter material containing benzene overheads while saturating the olefins, diolefins and acetylenes The $C_7$ and heavier materials are taken as bottoms. The overheads are fed to a third distillation tower which contains a catalyst suitable for the alkylation of the benzene with either ethylene or propylene. The alkylated product, either ethyl benzene or cumene, is removed as bottoms and unreacted lower boiling material is removed overhead. If no sulfur is present in the naphtha, e.g., a reformed naphtha, the first tower is not used.

In another embodiment the octane number of the light reformate is improved by subjecting the whole light naphtha to treatment for removal of the unsaturated materials and then alkylation with a controlled lower olefin contained in the waste gas from an FCCU.

In one embodiment the hydrogenation is carried out in the same column as the alkylation, both being operated as catalytic distillations. The aryl compounds catalytically react with the olefinic compounds to preferentially produce mono-substituted alkylated aryl compounds having a higher octane number and lower specific gravity than the original aryl compounds. At the same time, the alkylated aryl compounds are fractionated from the unreacted materials. The catalytic distillation structure provides both the catalytic sites and the distillation sites. The alkylated aryl compounds are withdrawn from the distillation reactor at a point below the alkylation fixed bed and the unreacted materials are withdrawn overhead at a point above the alkylation fixed bed. Examples of suitable acidic catalysts include molecular sieves (mole sieves) such as the zeolites.

To prevent the undue catalyst aging of the alkylation catalyst the higher boiling olefins and other unsaturates contained within the light reformate may be saturated by hydrogenation in a separate bed of hydrogenation catalyst prior to introduction to the alkylation bed. This can be done in a conventional fixed bed in front of the distillation column reactor. More preferably the hydrogenation is carried out in a distillation reaction zone in the distillation column reactor located below the alkylation zone. The alkylating olefin, e.g., the FCCU waste gas must be fed above the hydrogenation zone and below the alkylation zone where it is combined with the light reformate having a reduced olefin content rising up from the hydrogenation zone. As in the alkylation zone the catalyst is in the form suitable for a distillation structure.

The source of the aromatic can either be from catalytic reforming or from a steam, catalytic cracking process, or a crude distillation (straight run naphtha). As noted above the light reformate (110–250° F.) boiling material from a catalytic reformer may contain appreciable quantities of higher olefins. The light naphtha from the steam or catalytic cracking processes contains more of the higher olefins and in addition appreciable quantities of organic sulfur compounds, predominantly mercaptans and some thiophenes. Thiophene in particular is considered a contaminant of benzene and benzene products.

The olefin source may be a relatively pure stream or from the FCCU as described above. In fluid catalytic cracking a heavy "gas oil" stream having a boiling range circa 600–1300° F. is combined with a fine catalytic substance, usually a zeolitic material, at elevated temperatures, about 900–1050° F., which breaks apart or cracks the longer chain hydrocarbons to shorter chain hydrocarbons. Some gas is produced, the amount depending on the severity of the cracking, the gas also being rich in unsaturated compounds, i.e., ethylene, propenes, and butenes. Since the compounds have value, they are usually recovered and used or sold separately. However, the unsaturated compound or olefin separation results in "waste gas" having an olefin content of up to 10 mole percent. This waste gas is normally used as fuel in the refinery heaters. This stream is also a suitable source of olefins for the alkylation described herein.

The FCCU waste gas contains a variety of unrecovered olefins, however the preponderant olefinic compounds are ethylene, propylene (propenes) and butenes. The remainder of the gas is made up of various saturated hydrocarbons. The typical total olefin content is 42.1 percent, divided into ethylene, 11.1 percent, propene, 30.6 percent; and butenes and higher, 0.4 percent.

In any case the olefinic compounds contained in the waste gas will always have a lower boiling point than the higher olefins of the light naphtha.

In the most general embodiment the purpose is to upgrade the octane of a light reformate. The whole light reformate boiling about 110–250° F. is fed along with hydrogen to a distillation column reactor below a hydrogenation zone containing hydrogenation catalyst in the form of a catalytic distillation structure where the olefinic materials contained in the reformate are saturated leaving the aromatic compounds. A controlled olefin content gas having only lower olefins such as the FCCU waste gas described above is fed above the hydrogenation zone but below an alkylation zone in the distillation column reactor. The light reformate having the olefins removed boils up into the alkylation zone which contains the alkylation catalyst also in the form of a catalytic distillation structure where the aromatic compounds are alkylated by the lower olefins. The alkylated aromatics are distilled downward and are eventually taken as bottoms from the distillation column reactor. Unreacted materials are taken as overheads with most being returned as reflux.

In a preferred embodiment the naphtha and hydrogen are fed below a hydrogenation/distillation zone in a first distillation column reactor. The mole ratio of hydrogen to olefin in the naphtha is about 10 to 1, preferably 1.5 to 1. The olefinic compounds in the light reformate combine with hydrogen in the presence of the hydrogenation catalyst to substantially saturate all of the olefinic material. The conditions within the hydrogenation zone are such that the olefins are hydrogenated but the aromatics remain. The first distillation column reactor is operated as a dehexanizer to remove the $C_6$ and lighter material containing the benzene as overheads. The $C_7$ and heavier materials are removed as bottoms. The bottoms material may be passed on to the gasoline blending pool or sent to a hydrodealkylation unit for additional production of benzene.

The hydrocarbon stream containing olefins along with a hydrogen stream at an effectuating hydrogen partial pressure of at least about 0.1 psia to less than 70 psia, preferably less than 50 psia is fed to a distillation column reactor. Very low total pressures may be used for optimal results in some of the present hydrogenations, preferably in the range of 50 to 150 psig with the same excellent results.

Catalysts which are useful in the hydrogenation reaction utilized in the invention include the Group VIII metals. Any suitable hydrogenation catalyst may be used, for example Group VIII metals of the Periodic Table of Elements as the principal catalytic component, alone or with promoters and modifiers such as palladium/gold, palladium/silver, cobalt/zirconium, platinum, nickel preferably deposited on a support such as alumina, fire brick, pumice, carbon, silica, resin or the like.

Generally the metals are deposited as the oxides on an alumina support. The supports are usually small diameter extrudates or spheres. The catalyst must then be prepared in the form of a catalytic distillation structure. The catalytic distillation structure must be able to function as catalyst and as mass transfer medium. The catalyst must be suitably supported and spaced within the column to act as a catalytic distillation structure. In a preferred embodiment the catalyst is contained in a woven wire mesh structure as disclosed in U.S. Pat. No. 5,266,546, which is hereby incorporated by reference. Other catalytic distillation structures useful for this purpose are disclosed in U.S. Pat. Nos. 4,731,229, 5,073,236 and 5,431,890 which are also incorporated by reference.

The present invention carries out the hydrogenations in a catalyst packed column which can be appreciated to contain a vapor phase and some liquid phase as in any distillation. The distillation column reactor is operated at a pressure such that the reaction mixture is boiling in the bed of catalyst (distillation conditions).

The present process for olefin saturation operates at overhead pressure of said distillation column reactor in the range between 0 and 350 psig, preferably 250 or less suitable 35 to 120 psig and temperatures in said distillation reaction bottoms zone in the range of 150 to 230° F., preferably 175 to 200° F., e. g. 175 to 180° F. at the requisite hydrogen partial pressures. The feed weight hourly space velocity (WHSV), which is herein understood to mean the unit weight of feed per hour entering the reaction distillation column per unit weight of catalyst in the catalytic distillation structures, may vary over a very wide range within the other condition parameters, e.g., 0.1 to 35 $hr^{-1}$.

In the current process the temperature is controlled by operating the reactor at a given pressure to allow partial vaporization of the reaction mixture. The exothermic heat of reaction is thus dissipated by the latent heat of vaporization of the mixture. The vaporized portion is taken as overheads and a portion of the condensible material condensed and returned to the column as reflux.

The downward flowing liquid causes additional condensation within the reactor as is normal in any distillation. The contact of the condensing liquid within the column provides excellent mass transfer for dissolving the hydrogen within the reaction liquid and concurrent transfer of the reaction mixture to the catalytic sites. It is thought that this condensing mode of operation results in the excellent conversion and selectivity of the instant process and allows the lower hydrogen partial pressures and reactor temperatures noted. A further benefit that this reaction may gain from catalytic distillation is the washing effect that the internal reflux provides to the catalyst thereby reducing polymer build up and coking. Internal reflux may vary over the range of 0.2 to 20 L/D (wt. liquid just below the catalyst bed/wt. distillate) to give excellent results.

The bottoms from the second distillation column reactor are fed to a third distillation column which serves as the alkylator. The third distillation column reactor contains a catalytic distillation structure in the upper portion which is an acidic catalyst contained in a suitable distillation structure container. Both the bottoms from the second distillation column reactor and olefin, either ethylene or propylene, are fed below the catalyst bed. Also, in order to achieve high selectivity toward monosubstitution (which is a preferred aspect of the present invention), there is a large excess of benzene to the olefin in the reactor in the range of 2 to 100 moles of benzene per mole of olefin, that is the net molar feed ratio of benzene to olefin may be close to 1:1, although the system is operated so as to maintain a substantial molar excess of benzene to olefin in the reaction zone. The benzene within the stream reacts with either ethylene or propylene to form the desire alkylated product—ethyl benzene or cumene. The alkylated product is removed as bottoms and the unreacted material is removed as overheads. Suitable acidic catalysts include molecular sieves (mole sieves) and cation exchange resins.

More specifically the mole sieve or cation exchange resin catalyst packing is of such a nature as to allow vapor flow through the bed, yet provide a sufficient surface area for catalytic contact as described in the previously noted U.S. Pat. Nos. 4,215,011, 4,302,356 and 4,443,559 which are incorporated herein in their entirety. The catalyst packing is preferably arranged in the upper portion of the distillation column reactor, more preferably occupying about one-third to one half of the column and extending substantially to the upper end thereof.

The success of catalytic distillation lies in an understanding of the principles associated with distillation. First, because the reaction is occurring concurrently with distillation, the initial reaction product is removed from the reaction zone as quickly as it is formed. The removal of the alkylation product minimizes polysubstitution, decomposition of the alkylation product and/or oligomerization of the olefin. Second, because the reaction mixture is boiling, the temperature of the reaction is controlled by the boiling point of the mixture at the system pressure. The heat of the reaction simply creates more boil up, but no increase in temperature. Third, the reaction has an increased driving force because the reaction products have been removed and cannot contribute to a reverse reaction (Le Chatelier's Principle).

As a result, a great deal of control over the rate of reaction and distribution of products can be achieved by regulating the system pressure. Also, adjusting the through-put (residence time=liquid hourly space velocity) gives further control of product distribution and degree of olefin conversion. The temperature in the reactor is determined by the boiling point of the liquid mixture present at any given pressure. The temperature in the lower portions of the column will reflect the constitution of the material in that part of the column, which will be higher than the overhead; that is, at constant pressure a change in the temperature of the system indicates a change in the composition in the column. To change the temperature the pressure is changed. Temperature control in the reaction zone is thus controlled by the pressure; by increasing the pressure, the temperature in the system is increased, and vice versa. It can also be appreciated that in catalytic distillation as in any distillation there is both a liquid phase (internal reflux) and a vapor phase. Thus, the reactants are partially in liquid phase which allows for a more dense concentration of molecules for reaction, whereas, the concurrent fractionation separates product and unreacted materials, providing the benefits of a liquid phase system (and a vapor phase system) while avoiding the detriment of having all of the components of the reaction system continually in contact with the catalyst which would limit the conversion to the equilibrium of the reaction system components.

Referring now to FIG. 1 the simple octane upgrading process is shown. The distillation column reactor is depicted at 10 with the upper and lower quarters of the column filled with standard distillation structure, e.g., packing or trays. The upper mid-section of the column is filled with the alkylation catalytic distillation structure as packing indicated at 12. The light reformate feed is fed into the column below the hydrogenation catalytic reaction zone 14 via line 2. Hydrogen may be fed via line 15 by admixture with the light reformate or directly (not shown) in to the column below the bed 14. The saturated compounds are substantially totally removed and the light reformate passing from the hydrogenation zone to admix with the olefin feed from line 2 is free of inherent unsaturates. This allows for control of the total olefin in the alkylation zone and eliminates the very undesirable higher olefins. The FCCU gas is fed into the column below the catalytic reaction zone 12 via line 1. The olefinic compounds in the FCCU gas react with the aryl compounds in the light reformate in the reaction zone to form higher boiling alkylated aryl compounds which are distilled off the catalyst into the lower distillations section. Any unreacted light reformate and FCCU gas which might be carried downward are boiled back up into the reaction zone for further reactions while the alkylated product exits the bottom of the column through line 8. Generally the unreacted lighter components are taken overhead through line 5 to condenser 13 where the unreacted light reformate is condensed. The combined unreacted products (gas and reformate) are then passed to accumulator 11 through line 4 where the gasses are allowed to become separated from the liquid reformate. The unreacted gasses are taken out the top of the accumulator via line 3 and the liquid light reformate taken out where it may be sent back to the distillation column as reflux via line 6 or recombined with the alkylated product via line 7. The recombined product, having a higher octane number and a lower specific gravity than the original light reformate may be taken to storage via line 9.

Such conventional items as valves, reboilers, slip streams, etc. are not shown, but would be obvious expedients to those setting up such equipment.

Figure 2:
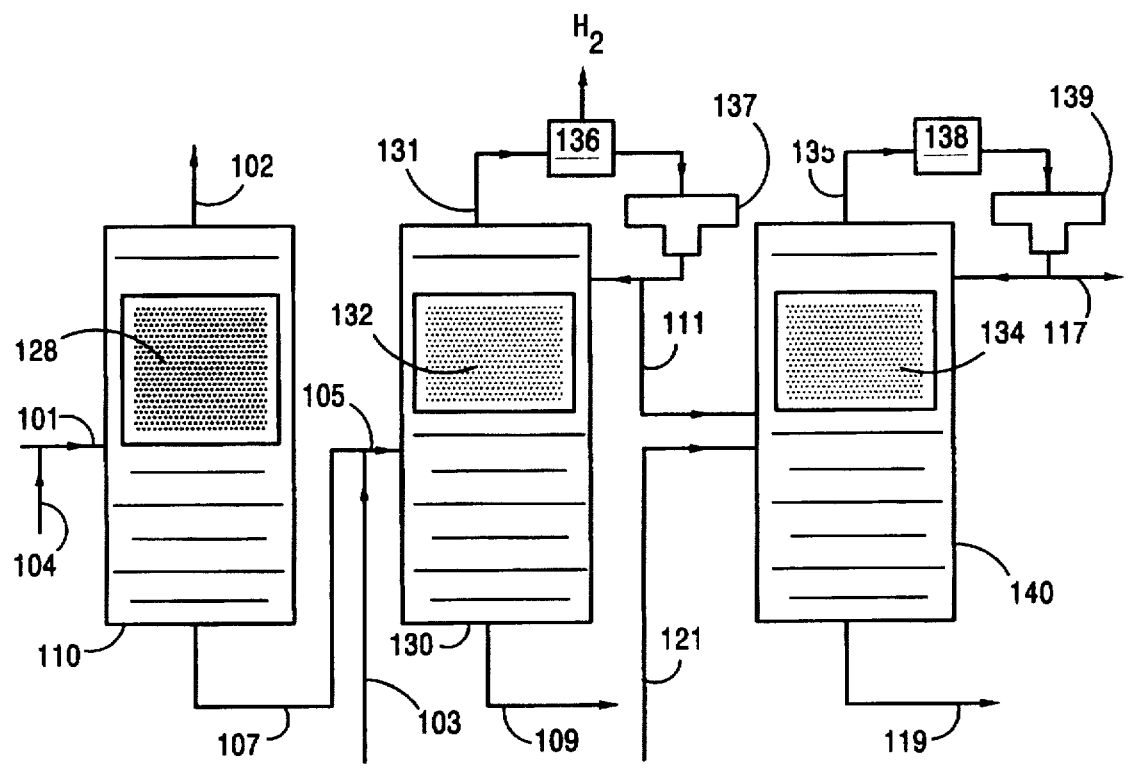
FIG. 2 is a flow diagram in schematic form of a second embodiment of the invention.

In FIG. 2 an overall process scheme can be seen. A $C_5$ 400° F. naphtha containing aromatics, olefins, and alkanes is fed via flow line 101 to a first distillation column 110. The first distillation serves as a desulfurization reactor to remove $H_2S$ and light ends overhead 102. The distillation reaction zone 128 contains a hydrodesulfurization catalyst prepared as a distillation structure. Hydrogen via line 104 is fed to the reactor concurrently with the hydrocarbon. The $C_5$ and heavier material is taken as bottoms from distillation column 110 via line 107 and is combined with hydrogen from flow line 103 in flow line 105 to feed to a distillation column reactor 130 below a distillation reaction zone 132 which contains a hydrogenation catalyst prepared as a catalytic distillation structure. Olefins, diolefins, and acetylenes are saturated while leaving aromatics unsaturated $C_7$ and heavier hydrocarbons are taken as bottoms from tower 130 via line 109. The $C_5$ and $C_6$ fraction is taken overhead 131 to a condenser/accumulator 136/137 which allows excess hydrogen to vent. A portion of the overhead liquid fraction is returned as reflux to column 130 and a portion is fed via line 111 to tower 140 below a distillation reaction zone 134 which contains an alkylation catalyst prepared as a catalytic distillation structure. The appropriate olefin, ethylene or propylene, is fed via line 121. The alkylate product, either ethylbenzene or cumene, being higher boiling than the feed is removed as bottoms via line 119. Unreacted material exits overhead via line 135 and is condensed and accumulated in condenser/accumulator 138/139 and a portion returned to column 140 as reflux and a portion removed overhead via flow line 117. Any polyalkylated products, such as diethylbenzene or dipropylbenzene, are removed as bottoms. The polyalkylates may be separated from the mono substituted products and recycled to the reactor for conversion to mono substituted products.

The three columns would include overhead condensers and bottoms reboilers, all of which are not shown.

The invention claimed is:

1. A process for the alkylation of aryl compounds contained in a light reformate comprising:
   (a) treating a light reformate containing aryl compounds and unsaturated compounds to selectively hydrogenate the unsaturated materials;
   (b) feeding said treated light reformate and a $C_2$–$C_4$ olefin to a distillation column reactor wherein
   (c) concurrently:
      (1) boiling said light reformate into a distillation reaction zone containing a fixed bed acidic molecular sieve or acidic cation exchange resin catalyst prepared as a distillation structure thereby catalytically reacting at least a portion of said aryl compounds with said $C_2$–$C_4$ olefinic compounds to form alkylated aryl compounds having a higher octane number and a lower specific gravity than said aryl compound in said light reformate stream; and
      (2) fractionating the resultant alkylated aryl compounds from unreacted light reformate;
   (d) withdrawing the alkylated aryl compounds from the distillation column reactor at a point below said reaction zone; and
   (e) withdrawing unreacted materials from the distillation column reactor at a point above said reaction zone.

9

2. The process according to claim 1 further comprising (a) feeding said light reformate containing unsaturated compounds to a distillation column reactor, containing a hydrogenation catalyst prepared as distillation structure, into a hydrogenation feed zone;

(b) feeding hydrogen into said feed zone, and (c) contacting said light reformate stream and said hydrogen with said hydrogenation catalytic distillation structure in a distillation reaction zone thereby catalytically reacting at least a portion of unsaturated compounds to form saturated compounds.

3. The process according to claim 2 wherein said unsaturated compounds comprise olefins above $C_4$.

4. The process of claim 1 further comprising separating any unreacted gas from any unreacted light reformate and combining said alkylated aryl compounds with said unreacted light reformate to provide a mixture having a higher octane number than said light reformate stream.

5. A process for the alkylation of benzene contained in a light naphtha comprising the steps of:

(a) feeding (1) a naphtha stream containing benzene, olefins, diolefins, acetylenes and organic sulfur compounds and (2) hydrogen to a first distillation column reactor where said organic sulfur compounds are hydrogenated to $H_2S$ which is removed as overheads along with light ends, and $C_5$ and heavier materials are removed as bottoms.

(b) feeding said bottoms containing benzene and olefins and additional hydrogen to a second distillation column reactor where said olefins, diolefins and acetylenes are hydrogenated to alkanes and the $C_6$ and lighter material is separated as a second overheads from the $C_7$ and heavier material which is taken as bottoms;

(c) feeding said second overheads along with an olefin selected from the group consisting of ethylene and propylene to a third distillation column reactor where benzene reacts with said olefin to produce an alkylated product and said alkylated product is separated as a third bottoms from the remainder of said $C_5$ and $C_6$ material which is taken as overheads from said third distillation column reactor.

6. The process according to claim 5 wherein said olefin is ethylene and said alkylated product comprises ethyl benzene.

7. The process according to claim 5 wherein said olefin is propylene and said alkylated product comprises cumene.

8. The process according to claim 6 wherein said alkylated product further comprises diethyl benzene.

9. The process according to claim 7 wherein said alkylated product further comprises dipropyl benzene.

10. The process according to claim 5 wherein the hydrogen partial pressure within said first distillation column reactor is less than 70 psi.

10

11. The process according to claim 5 wherein the hydrogen partial pressure within said second distillation column reactor is less than 70 psi.

12. The process according to claim 5 wherein the molar ratio of benzene to olefin within said third distillation column reactor is about 20:1.

13. The process according to claim 6 wherein said third bottoms stream is substantially pure ethyl benzene.

14. The process according to claim 7 wherein said third bottoms stream is substantially pure cumene.

15. A process for the production of cumene comprising the steps of:

(a) feeding (1) a naphtha stream containing benzene, olefins, diolefins, acetylenes and organic sulfur compounds and (2) hydrogen to a first distillation column reactor where said organic sulfur compounds are hydrogenated to $H_2S$ which is removed as overheads along with light ends, and $C_5$ and heavier materials are removed as bottoms.

(b) feeding said bottoms containing benzene and olefins and additional hydrogen to a second distillation column reactor where said olefins, diolefins and acetylenes are hydrogenated to alkanes and the $C_6$ and lighter material is separated as a second overheads from the $C_7$ and heavier material which is taken as bottoms;

(c) feeding said second overheads along with propylene to a third distillation column reactor where benzene reacts with said propylene to produce cumene and said cumene is separated as a third bottoms from the remainder of said $C_5$ and $C_6$ material which is taken as overheads from said third distillation column reactor.

16. A process for the production of ethyl benzene comprising the steps of:

(a) feeding (1) a naphtha stream containing benzene, olefins, diolefins, acetylenes and organic sulfur compounds and (2) hydrogen to a first distillation column reactor where said organic sulfur compounds are hydrogenated to $H_2S$ which is removed as overheads along with light ends, and $C_5$ and heavier materials are removed as bottoms.

(b) feeding said bottoms containing benzene and olefins and additional hydrogen to a second distillation column reactor where said olefins, diolefins and acetylenes are hydrogenated to alkanes and the $C_6$ and lighter material is separated as a second overheads from the $C_7$ and heavier material which is taken as bottoms;

(c) feeding said second overheads along with ethylene to a third distillation column reactor where benzene reacts with said ethylene to produce ethyl benzene and said ethyl benzene product is separated as a third bottoms from the remainder said $C_6$ material which is taken as overheads from said third distillation column reactor.

* * * * *